Jan. 12, 1926.
1,569,472

M. A. FRONEY

MACHINE FOR PREPARING FOOD PRODUCTS

Filed Feb. 1, 1924
4 Sheets—Sheet 2

Witness:
R. E. Weber

Inventor:
Maynard A. Froney
Young & Young
Attorneys

Jan. 12, 1926. 1,569,472
M. A. FRONEY
MACHINE FOR PREPARING FOOD PRODUCTS
Filed Feb. 1, 1924 4 Sheets-Sheet 3
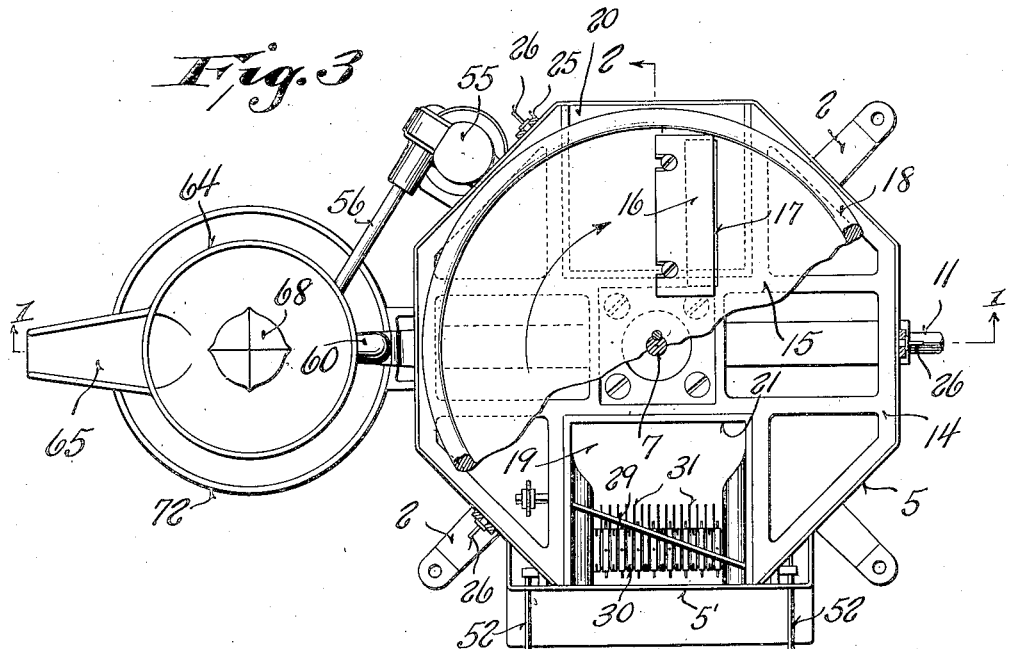
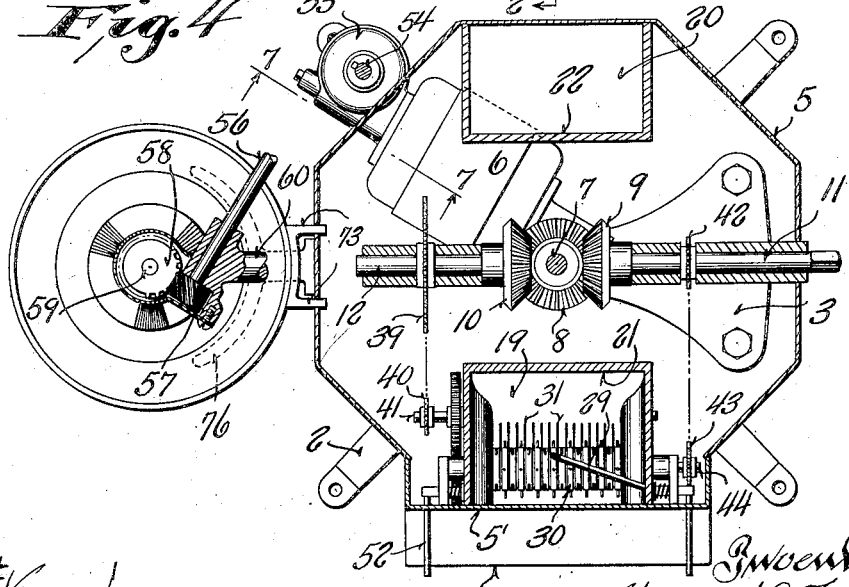

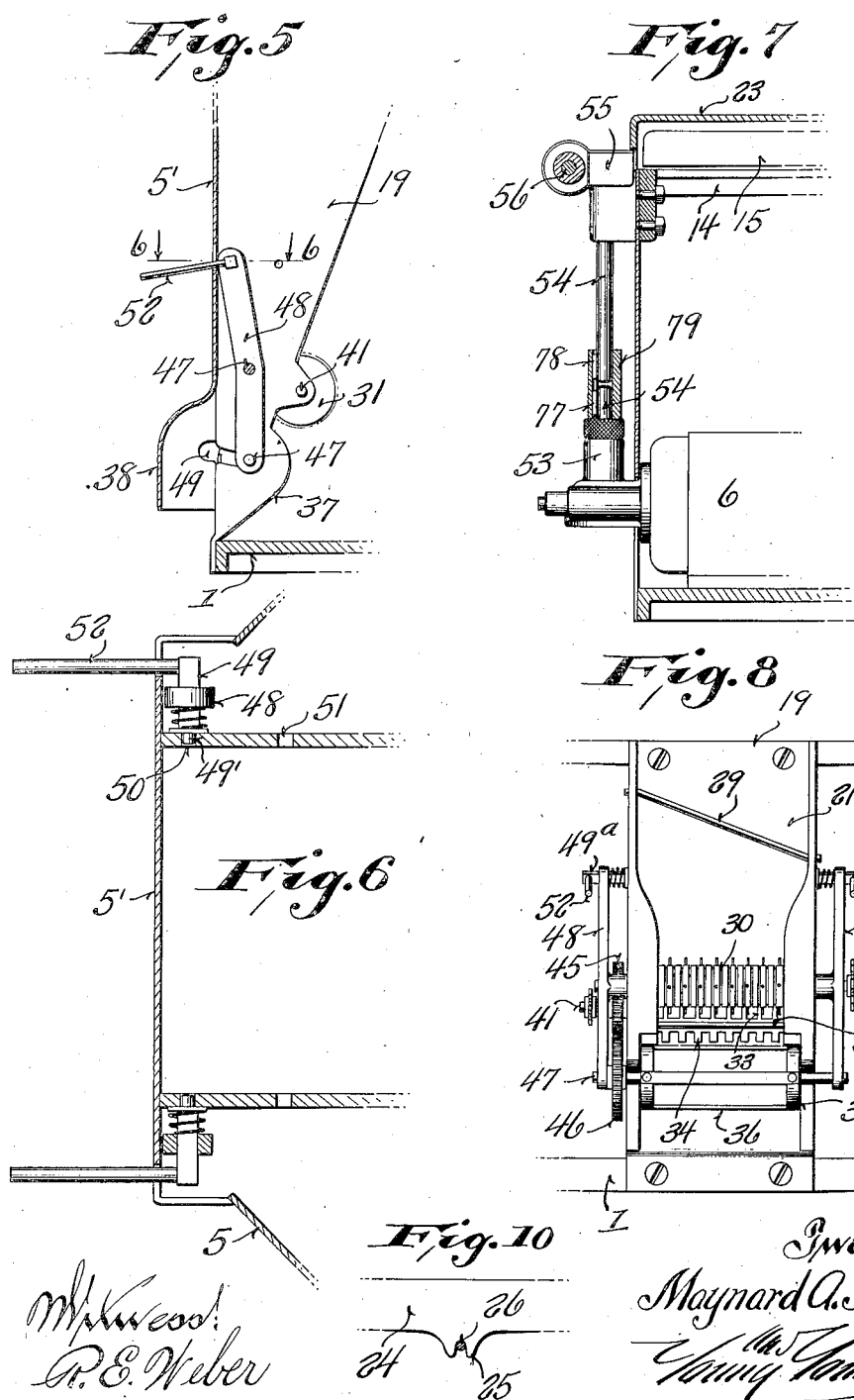

Patented Jan. 12, 1926.

1,569,472

UNITED STATES PATENT OFFICE.

MAYNARD A. FRONEY, OF RACINE, WISCONSIN.

MACHINE FOR PREPARING FOOD PRODUCTS.

Application filed February 1, 1924. Serial No. 689,920.

*To all whom it may concern:*

Be it known that I, MAYNARD A. FRONEY, a citizen of the United States, and resident of Racine, in the county of Racine and State of Wisconsin, have invented certain new and useful Improvements in Machines for Preparing Food Products; and I do hereby declare that the following is a full, clear, and exact description thereof.

This invention relates to machines for preparing food products, such as used in hospitals, hotels, restaurants, and in fact in homes.

Objects of this invention are to provide a self-contained machine which may be either power driven or manually driven, which will prepare foods in a number of different ways, such for example as slicing the food, as slicing and subsequently cutting the slices into long stringers or shoe strings, or of transversely cutting these stringers so as to form small cubes, this latter operation being commonly known as dicing.

Further objects are to provide a machine which is equipped to slice, shoe string, and dice, which is adapted to extract the juice from fruits, which is adapted to beat and thoroughly mix drinks, and which is so constructed that the fruit extracting and drink mixing portions may be operatively disconnected from the machine when desired.

Further objects are to provide a machine for preparating food products which is adapted to be separated into parts for ready cleaning and thorough sterilization, which is adapted to removably hold the drink receiving portion, and which is adapted to deliver the extracted juice in any one of several directions.

Further objects are to provide a machine for preparing food products in which all of the operating parts are fully and adequately housed to prevent inadvertent damage to the operator, and to provide a machine in which tubular holders are provided for the material being sliced, shoe stringed or diced, so that there is no danger whatsoever of injuring the operator's hands.

An embodiment of the invention is shown in the accompanying drawings, in which:—

Figure 3 is a plan view of the machine with the upper cover removed and with a portion of the slicing disk broken away.

Figure 4 is a horizontal sectional view on the line 4—4 of Figure 1.

Figure 5 is a detail of the adjusting means for the dicer.

Figure 6 is a sectional view on the line 6—6 of Figure 5.

Figure 7 is a partial sectional view illustrating the clutch mechanism for the drink mixing and juice extracting mechanism.

Figure 8 is a face view of the shoe string and dicing mechanism with the housing adjacent such portion removed.

Figure 10 is a fragmentary detail of a portion of the cover or casing for the slicing disk.

Figure 1:
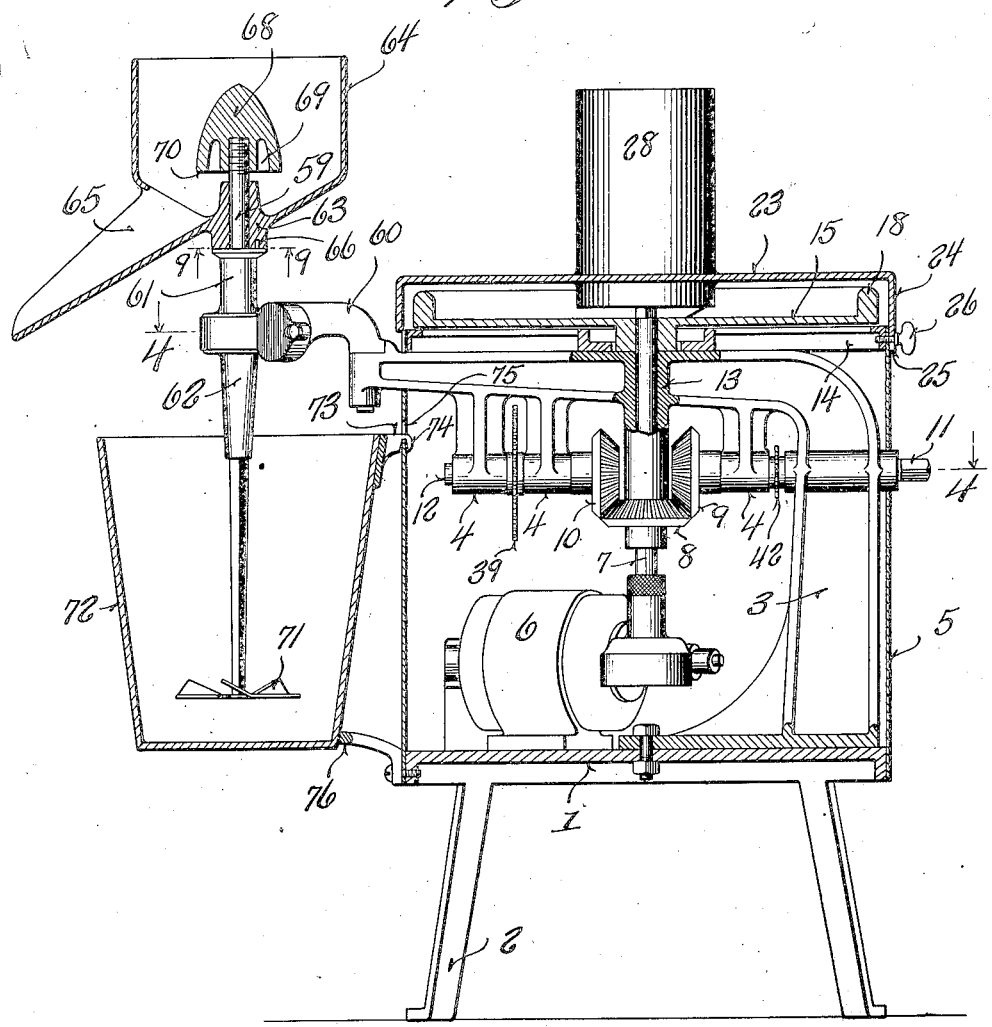
Figure 1 is a vertical sectional view through the machine, on the line 1—1 of Figure 3.

The machine comprises a main frame work including a base 1 which may be provided with a plurality of supporting legs 2, and which is provided with an upstanding main support 3, such support having a plurality of downwardly extending bearings 4, as shown in Figure 1. If desired the legs may be suitably apertured to receive securing screws or bolts and it is also preferable to provide a closed bottom for the machine, although obviously, if for any reason it is found desirable an openwork bottom might be employed. If desired the main support may be made as a separate entity from the frame work of the machine, as illustrated in the drawings. A side member 5 may be provided and may constitute a housing for the interior mechanism, such side portion may, if desired, be removable. Within the housing an electric motor 6 is mounted preferably upon the base 1 and through a worm and worm wheel, drives a vertical shaft 7. This shaft carries a bevel wheel 8 which meshes with opposed bevel gears 9 and 10, such latter bevel gears being connected with shafts 11 and 12,—the shaft 11 being provided with a projecting squared portion adapted to receive a hand crank when desired. The shaft 7, it will be noted, extends upwardly through a vertical bearing 13 formed in the main support 3. This main support is also provided with a flat upper face upon which is mounted a spider or frame work 14. Immediately above the upper frame 14 a slicing disk 15 is positioned and is rigidly and detachably secured to the upper end of the central vertical shaft 7. This slicing disk is preferably provided with one or more knives 16 (see Figure 3) which is located immediately above a corresponding notch or slot 17 formed in the slicing disk. Further, this slicing disk may, if desired, be provided with a relatively heavy peripheral portion or rim 18 so as to give considerable inertia, with reference to a central axis, to thus store energy and act in the nature of a fly wheel. This action is desirable when slicing and operating upon material for during the brief periods when the machine is not actually working the fly wheel effect will cause the slicing disk to store up considerable energy and aid the motor when a relatively large demand is made.

Figure 2:
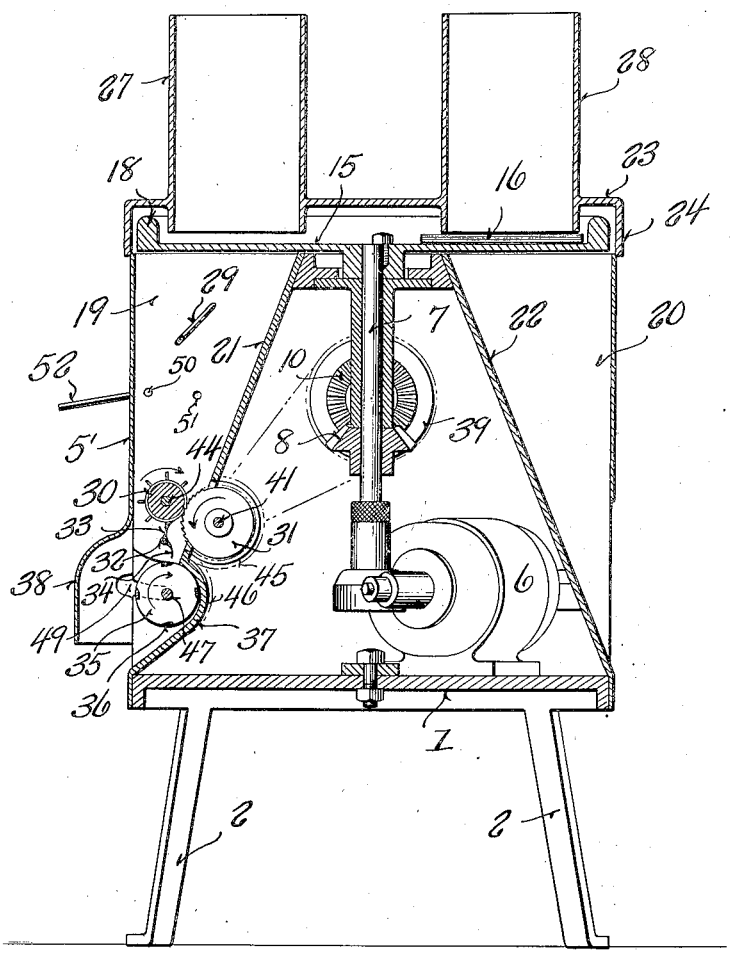
Figure 2 is a corresponding view taken on the line 2—2 of Figure 3.

It is to be noted from Figures 2 and 3 that the main body of the machine is provided with wedge shaped chutes 19 and 20. These chutes are respectively provided with flat rear faces 21 and 22 which slant downwardly and outwardly as shown in Figure 2.

A top member or cover 23 is provided with a downwardly depending flange 24 and with a plurality of downwardly depending lugs 25 formed upon such flange, as shown in Figures 1, 2, and 10. These downwardly depending lugs are arranged in pairs and are adapted to receive between them the threaded stem of clamping wing nuts or thumb screws 26 (see Figures 2 and 3). This cover is provided with a pair of upstanding tubular members 27 and 28 which are so related to the downwardly depending lugs and the thumb screws that when the cover is positioned, these tubular members are respectively positioned above the chutes 19 and 20. The purpose of this definite positioning of the tubular members is to insure the depositing of the slices cut from material fed to such tubular member in the chutes 19 and 20. In other words, these tubular members 27 and 28 form in effect hoppers for the reception of the untreated food such, for instance, as potatoes, cabbages, and other articles which it is desirable to slice. It is to be noted from Figures 2 and 3 that the slicing knife 16 has its cutting edge spaced upwardly from the plane of the slicing disk 15 and that the lower ends of the tubular members 27 and 28 closely approach the upper face of the slicing knife, thus it is not necessary for the operator to insert his hand in the tubular hoppers for the reason that the weight of the material will position it against the slicing disk and the upwardly spaced knife will slice appropriate thickness of material without any assistance from the operator.

The purpose of having two chutes 19 and 20 for the slices is to provide means whereby either a plain slice may be delivered, as from the chute 20, or a further treated slice may be delivered, as from the chute 19, as will be described herewith. In the chute 19 a downwardly and outwardly extending deflector bar 29 is provided, as may be seen from Figures 2, 3, 4, and 8 which is adapted to turn the slice about 90° to cause it to lie flatly against the back slanting portion 21 of such chute. From this point the slice slides downwardly until it is engaged by the projecting teeth or prongs of a feed roller 30 mounted transversely of and adjacent the lower portion of such chute. This roller feeds the material against a set of circular saws 31 which have their teeth so arranged, as shown in Figure 2, that the slanting sides thereof are the leading sides. These saws or disk cutters project through slots in the slide 21, as may be seen from Figures 3 and 4. The feed roller 30, as may be seen from Figures 2, 3, and 4 is provided with a plurality of shallow peripheral grooves adapted to receive the teeth of the saw, and it is further to be noted that a transversely extending stripper bar 32 is provided adjacent the lower side of such roller. This stripper bar, as may be seen from Figure 8, is provided with a plurality of upstanding extending teeth 33 adapted to strip the material from the prongs of the feed roller in case the material adheres thereto, and it is further provided with a plurality of downwardly extending fingers 34 adapted to hold the material in relatively close contact with the rear slanting face 21. The slices, after they have passed the feed roller and saws or circular cutters, pass to a rotary cutter 35 provided with a plurality of longitudinally extending knives 36 which cooperate with the lower edge of the slide 21 and thus cut the elongated stringers from the rotary cutter or disk cutter 31 into a plurality of cubes. This cutter 35 is received in a recessed curved portion 37 of the rear slide 21, as shown in Figure 2. If desired, the housing may be bowed outwardly, as indicated at 38 in Figure 1, to provide additional spacing at this point. The timing of the roller 30, the disk cutter 31, and the cutters 35 is such that cubes of accurate shape are formed. It is sometimes desirable to deliver the food in the form of elongated stringers commonly known as shoe strings, and this is readily attained by moving the transverse cutter 35 outwardly by mechanism hereinafter to be described.

The means for driving the disk cutters or saws 31 is illustrated in Figures 2 and 4 from which it will be seen that the shaft 12 is provided with a relatively large sprocket wheel 39 which is connected by means of a chain with a smaller sprocket wheel 40 mounted on the shaft 41 of the cutters 31. A sprocket wheel 42 is mounted upon the shaft 11, as shown in Figure 4, and by means of a chain drives a sprocket wheel 43 mounted upon the shaft 44 of the feed roller 30. The shaft 41 of the cutter 31 is provided with a gear 45 which normally meshes with a gear 46 mounted upon the shaft 47 of the cutter 35, as shown in Figures 2 and 8. The means for moving the transverse cutter 35 out of operative position may comprise a pair of levers 48 pivotally mounted upon the shaft 44 of the feed roller and carrying at their lower ends the shaft 47 of the transverse cutter 35. The sides of the chute and associated portions of the casing are provided with arcuate slots 49 (see Figure 2) to accommodate the swinging motion of the shaft 47. The upper ends of the levers 48, as may be seen from Figures 5, 6 and 8, are provided with inwardly pressed plungers 49ᵃ which are preferably rectangular in cross section and are slidably carried by the levers 48. The inner ends of the plunger are rounded as indicated at 49′ in Figure 6 and are adapted to be received in the apertures 50 or 51 formed in the side walls of the chute 19 to thus hold the transverse cutter 35 either in its operative or its inoperative position. A pair of handles 52 are rigidly carried by the plungers 49 and project outwardly through the cover 5′ for the chute 19, it, of course, being understood that either or both chutes may be provided with removable covers to facilitate cleaning.

Figure 9:
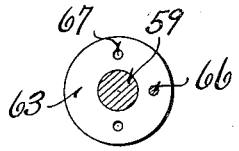
Figure 9 is a sectional view on the line 9—9 of Figure 1.

It is to be noted from Figures 1, 2 and 4 that the motor 6 is so set that its rear bearing projects outwardly from the housing and this portion of the motor is attached to a casing 53 which houses reduction gearing between the motor shaft and the vertical shaft 54. The upper portion of this vertical shaft is received in a housing 55 (see Figures 3 and 7) which also houses the gearing connecting such vertical shaft with a transverse shaft 56. This latter shaft carries at its outer end a helical gear 57 (see Figure 4) which meshes with a helical gear 58 mounted upon a vertical shaft 59 spaced outwardly a considerable distance from the main body of the machine and carried by an outwardly projecting arm 60 (see Figures 1 and 4). The arm 60 is so formed as to constitute in effect a housing for the gears 57 and 59 and is provided with an upwardly projecting portion 61 provided with a flat upper face. If desired, an elongated bearing may be secured for the shaft 59 by further extending the parts downwardly, as indicated at 62 in Figure 1. The portion 61 is adapted to support the hub 63 of a hopper or shell 64. This shell is provided with a delivery trough 65 which projects outwardly therefrom and is adapted to lead liquids or semi-liquids from the shell. This trough may be directed in any line desired, and may be held in such position. The means for accomplishing this adjustment comprises a pin 66 carried by the member 61 and adapted to seat within any one of a plurality of apertures 67 formed in the bottom face of the hub 63, as shown in Figures 1 and 9, it being understood that sufficient room is allowed for the slight lift of the hub upwardly to effect these adjustments. The upper part of the shaft 59 is provided with a conical somewhat fluted enlargement 68 which is adapted to be rotated by the shaft and to have portions of fruit, for instance, forced against it to extract the juices. It is to be noted that the head 68 overhangs the hub 63 and is provided with a lower annular recess 69,—thus forming a depending flange 70 which sheds the liquid and semi-liquid outwardly from the hub 63. The head 68 is screw threaded to the shaft 59 and may be readily removed to permit the removal of the member 64. The lower portion of the shaft 59 carries a beater 71 which is used for mixing and beating operations. A removable mixing vessel or cup 72 is provided for holding the drinks and may conveniently be of tapered contour, as shown. Its upper portion is provided with a pair of arms 73 which are notched, as indicated at 74, in Figure 1, and are adapted to be received in apertures 75 formed in the side wall of the main housing 5 and to hook over such housing. The lower portion of the cup 72 is adapted to bear against a curved arm 76 supported from the main body of the machine, as shown in Figures 1 and 4. Thus it will be seen that the cup may be most readily detached by slightly elevating it and unhooking the arms 73, thereafter, lowering and removing the cup, sufficient space being left between the plane of the main support upon which the machine rests, and the beater 71 to permit this operation.

It is frequently desirable to detach the juice extracting and drink mixing portion of the machine from the remaining portions. This is readily accomplished by forming the vertical shaft 54 in two parts, as shown in Figure 7, and providing a simple type of clutch for connecting these parts. For instance, the two parts of the shaft may be provided with keys 77 and 78, and a sleeve 79 may be loosely positioned upon the shaft and suitably slotted to receive the keys. As shown in Figure 7, this clutch mechanism operatively couples the two parts of the shaft 54. When, however, it is desired to disconnect these parts, it is merely necessary to elevate the sleeve 79 and to give it a sliding turn so that it may rest upon the uppermost key 78.

It will be seen that a machine for preparing food products has been provided which is adapted to either slice material in a plain slice and to deliver such material in this condition or to further operate upon the sliced material to either cut it into stringers or to dice it,—such selection being easily made by a slight adjustment of the parts, as previously described.

It will further be seen that a machine for accomplishing the above noted operations has been provided with a simple type of clutch mechanism for driving a juice extracting device and a drink mixing device in a simple and effective manner.

Although the invention has been described in considerable detail, it is to be understood that the invention may be variously embodied and is, therefore, to be limited only as claimed.

I claim:

1. A machine for preparing food products comprising a pair of hoppers, a pair of chutes located below said hoppers, a slicing disk located between said hoppers and said chutes, one chute adapted to deliver the material as it comes from the slicing disk, and a series of circular cutters adapted to operate upon the material in the other chute for longitudinally slitting the slices into stringers.

2. A machine for preparing food products comprising a pair of hoppers, a pair of chutes located below said hoppers, a slicing disk located between said hoppers and said chutes, one chute adapted to deliver the material as it comes from the slicing disk, a series of circular cutters adapted to operate upon the material in the other chute for longitudinally slitting the slices into stringers, and means for transversely cutting the stringers.

3. A machine for preparing food products comprising a pair of hoppers, a pair of chutes located below said hoppers, a slicing disk positioned between said hoppers and chute, one of said chutes being adapted to deliver the slices as they come from the slicing disk, a series of circular cutters projecting into the other chute and adapted to slit the slices delivered to such chute into stringers, means for transversely cutting the stringers into cubes, and feeding means for uniformly feeding the slices to the slitting cutters.

In testimony that I claim the foregoing I have hereunto set my hand at Racine, in the county of Racine and State of Wisconsin.

MAYNARD A. FRONEY.